Patented Apr. 15, 1941

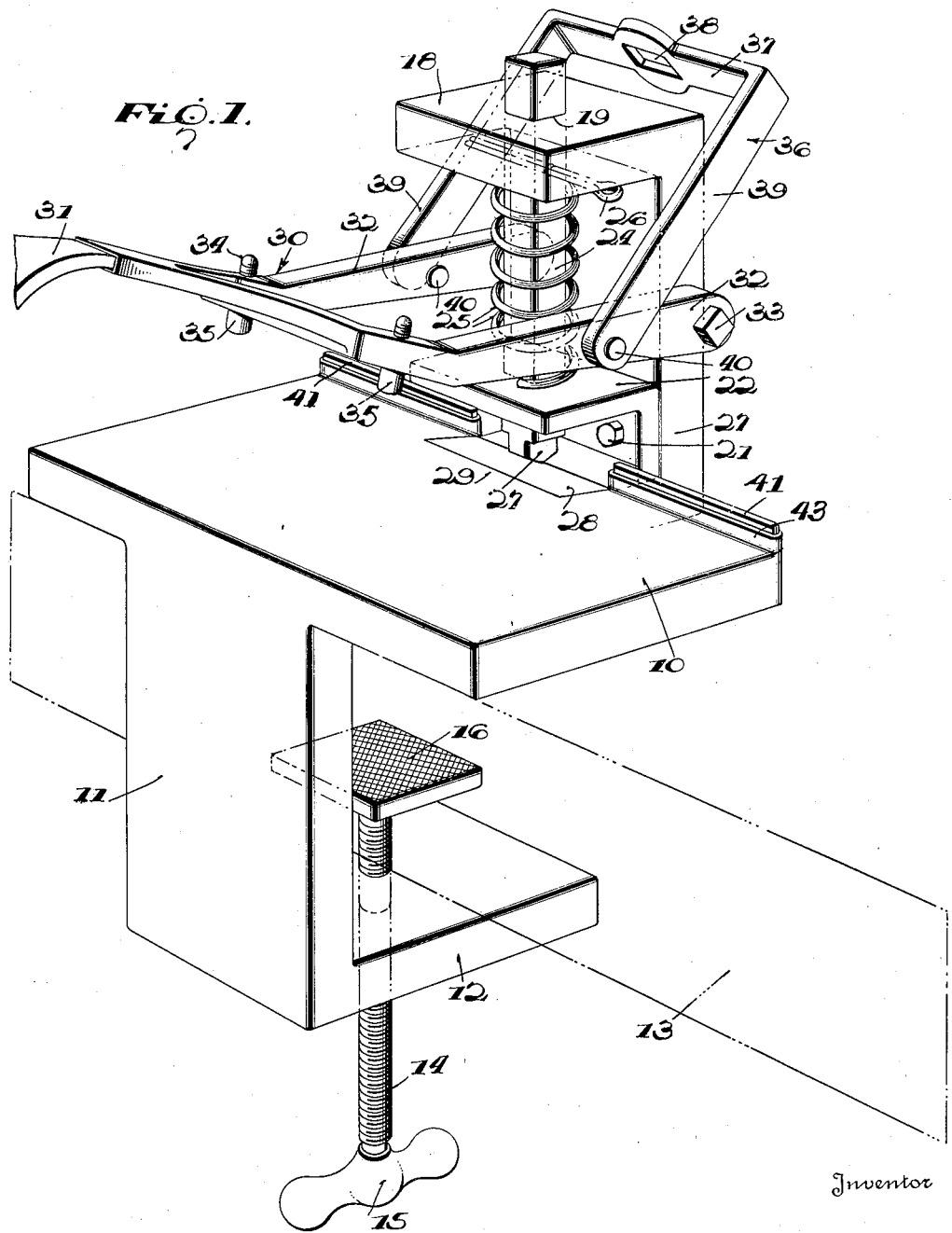

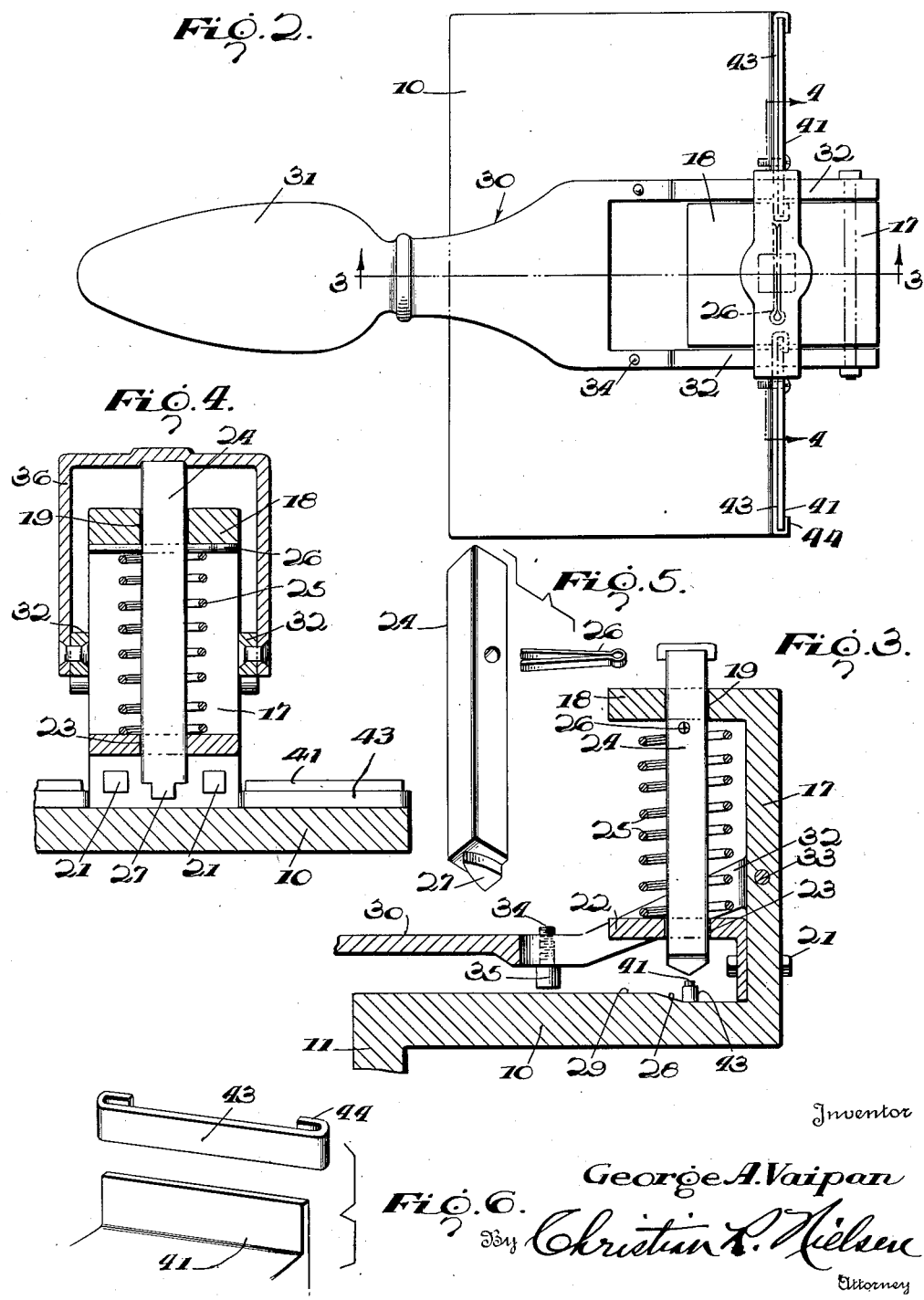

2,238,405

UNITED STATES PATENT OFFICE 2,238,405

BENCH SAW SETTING DEVICE

George A. Vaipan, Anchorage, Territory of Alaska

Application September 19, 1940, Serial No. 357,389

7 Claims. (Cl. 76—68)

This invention relates to a saw setting device and it consists in the constructions, arrangements and combinations herein described and claimed.

It is an object of the invention to provide a saw setting device of novel construction permitting the setting of teeth of a saw accurately, by unskilled labor.

It is a still further object of the invention to provide a saw tooth setting device in which the teeth are set either by a hammering or pressing action, thereby accommodating the device to saws having large or small teeth.

It is also an object of the invention to provide an adjustable gauge of novel construction, permitting the setting of saw teeth of both large or small saws, yet employing the same anvil.

It is a still further object of the invention to provide a novel adjustable clamping means for holding the saw blade, thus maintaining the teeth upon an anvil at the proper angle for setting thereof.

It is a still further object of the invention to provide resilient adjustable clamping pads to accommodate saws of varying thicknesses.

It is a further object of the invention to provide a reciprocable plunger cooperable with an anvil for setting the teeth of a saw.

A further object of the invention is the provision of a spring for raising the plunger after setting of a tooth.

It is also an object of the invention to provide a novel construction of pivotally mounted operating handle including a yoke manually movable to operative position above the plunger for moving the plunger into setting engagement with a tooth of a saw.

It is a still further object of the invention to provide a saw tooth setting plunger which may be reversed by removal of a pin, adapting the plunger to use on small or large saw teeth.

It is a still further object of the invention to provide a base member having an upright member, the latter having a horizontal plate provided with an angular hole; and also a second plate spaced therebelow having an angular hole, the holes being aligned for reception of an angular reciprocating plunger, thus maintaining the plunger against rotary movements.

Additional objects, advantages and features of invention will be apparent from the following description considered in conjunction with the accompanying drawings, wherein Figure 1 is a perspective view of my saw setting device.

Figure 2 is a top view thereof.

Figure 3 is a vertical sectional view taken substantially on the line 3—3 og Figure 2.

Figure 4 is a vertical sectional view taken substantially on the line 4—4 of Figure 2.

Figure 5 is a perspective view of the set plunger and the retaining cotter pin.

Figure 6 is a detailed perspective view of the new setting gauge and support therefor.

Attention is now directed to Figures 1 to 6 of the drawings for an understanding of the construction of the saw setting device, wherein there is shown a planiform base member 10 which may have any desired dimensions. The base member 10 includes a downwardly extended leg portion 11 and a horizontal foot portion 12, the latter extended inwardly and in parallel relation to the base 10. The base 10 and foot 12 are spaced apart such a distance as to readily receive a table, bench, or the like, indicated at 13 therebetween. In order that the base may be firmly secured to the table or bench the foot 12 is provided with a threaded aperture into which a threaded bolt 14 is engaged. The lower end of the bolt is provided with a wing nut 15 for actuating the bolt and the inner end of the bolt has a swivelly mounted thrust plate 16, the upper face of which is suitably roughened or scored in order to maintain a good gripping engagement upon a table or other support. Obviously, the construction described permits a quick attachment or detachment from a supporting surface, and this is accomplished without the use of mounting bolts, making the device readily portable.

Integrally formed with the base 10 there is an upright standard 17 having a horizontal plate 18 disposed inwardly over the base 10 a suitable distance, and as clearly shown in Figures 3 and 4, the plate is provided with an angular hole 19 for a purpose to be presently explained.

Spaced a suitable distance below the plate 18 there is mounted as at 21, a second plate 22, which is also apertured as at 23, and in vertical alignment with the hole 19, the aperture 23 also having angular formation corresponding to the hole 19.

A saw tooth setting plunger 24, of angular formation, is reciprocably mounted in the aligned holes, and in order that the plunger 24 may be maintained in an inoperative raised position, a helical spring 25 is provided upon the plunger positioned between the plate 22 and a cotter pin 26 positioned beneath the plate 18. The pin is detachably mounted in a horizontal hole in the plunger 24. It will be apparent that the tension of the spring 25 will maintain the plunger in raised positon, as clearly shown in Figures 3 and 4, and that the plunger is held against turning. The setting plunger 24 is provided with a triangular shaped working face 27 corresponding to the general shape of a saw tooth, and in use the apex of the working face 27 is set inwardly toward the saw blade when setting large saw teeth, and placed in reverse position so that the apex of the triangular working face is disposed outwardly from the saw blade, when setting small saw teeth.

The plunger 24 may be readily renewed by merely removing the cotter pin 26, when the setting plunger is free to be withdrawn from the plates 18 and 22.

Inwardly of the upright portion 17 the base 10 is formed with an inclined portion 28 adjacent the saw blade supporting portion 29, the inclined portion 28 serving as an anvil upon which the teeth of a saw may be set. To this end the anvil will be positioned medially beneath the working face of the plunger 24. Obviously, the inclination of the portion 28 will be that at which a tooth is to be set, and it is therefore within the scope of the invention to make the anvil removable in order to install anvils of different size and inclination, if desired.

As clearly shown in Figures 1 and 2, a saw clamping and plunger operating handle 30 is provided, in the present instance comprising a handle proper 31, and a pair of spaced arm portions 32 adapted to embrace the upright member 17. The arms 32 are each pivotally mounted upon respective sides of the upright 17 by means of bolts 33.

Each of the arms 32 have mounted therein, upon the under side, a saw holding member 34. The holding members 34 are provided with threaded studs for engagement in threaded apertures, whereby the holding members may be adjusted to different thicknesses of saws. Each holding member 34 is provided with a foot portion 35, preferably formed of rubber or similar material, adapted to be compressed so as to firmly grip a saw blade when brought thereagainst through operation of the handle 30.

A substantially U-shaped yoke 36 is pivotally connected to the arm members 32 of the operating handle, as clearly shown in Figure 1. In the present instance the yoke comprises a strap portion 37 having a medial recess 38 complemental to the projecting upper end of the plunger 24 and a pair of leg members 39 spaced so as to embrace the arms 32 of the handle. The legs 39 are pivotally connected to the arms as at 40, and the function of the yoke will be dealt with more fully hereinafter.

Upon the rear edge of the base 10 upon opposite sides of the upright 17, elongated supports 41 are provided which function as gauges as well as for mounting of secondary gauge members, as will now be described. The supports 41 project slightly above the base 10 as clearly shown in Figure 1, so as to receive secondary gauge members 43 thereover. In the present instance, the gauge members 43 are provided with the recurved ends 44 into which the support 41 is engageable. Thus, the gauge members are readily removable to allow use of the gauges 41 and replaceable as required.

The operation of the device will be readily understood from the following description.

It will be assumed that a saw is to be set having large teeth. In this instance, the gauges 43 will be removed from the supports 41. The saw is then laid flat upon the base over the portion 29 with teeth positioned directly above the anvil 28, the teeth resting against the gauge 41 and beneath the working face of the plunger 24. The handle 30 is now grasped and moved downwardly, swinging on the pivots 33, until the pads 35 engage the saw firmly. In this position of the parts, pressure or a force is imparted to the upper end of the plunger 24, by means of a hammer or otherwise. Obviously, after a blow upon the plunger, the spring 25 will return the plunger to the raised position. The pressure on the lever 30 is released and the saw moved to bring the next tooth to be set into proper position upon the anvil.

When a saw having small teeth is to be set it is not desirable to give the plunger a driving force, but rather a pressing force is found most practical, in order to avoid breakage of the tooth, and this is accomplished in the following manner.

First, the gauges 43 are positioned upon respective support gauges 41 to properly align the teeth of the saw upon the anvil. Next the pads 35 are adjusted with respect to the saw supporting surface 29. The yoke 36 is manually swung upwardly above the plunger 24 so as to position the recess 38 thereover. The handle 30 is moved downwardly, swinging on the pivot 33, with consequent downward movement of the plunger 24 to engage the tooth to be set, the saw being manually held in position on the anvil. Final pressure is now exerted upon the handle 30, causing engagement of the working face of the plunger 24 with the tooth, and the pads now come to rest upon the saw blade. Such final pressure is possible by reason of the fact that the pads 35 are resilient and readily compressible. When the tooth has been set, the lever 30 is released and the spring returns the parts to normal position.

While I have shown and described my invention specifically, this is merely to set forth a preferred construction, and I consider as my own all such modifications in construction as fairly fall within the scope of the appended claims.

I claim:

1. In a device of the class described, a base adapted to be removably secured to a support, an anvil formed in the base, a reversible cooperating setting plunger, a spring embracing the plunger and normally influencing said plunger upwardly from said anvil, upright means on the base, a pivotally mounted saw clamping means on the upright means, a pivotally mounted yoke on said clamping means movable to engage the upper end of the plunger, and a selective gauging means mounted on the base, said gauging means comprising supports on the base and removable gauge members slidably embracing said supports.

2. In a device of the class described, a base, an anvil on the base, gauge members in opposed relation to the base, an upright member on the base, said upright member having a pair of horizontally disposed vertically spaced plates, each of the plates having an angular hole, an angular reversible, cooperating setting plunger reciprocable through the holes, a helical spring embracing said plunger and positioned between the lowermost plate, and a stop means on the plunger, said stop means being below said uppermost plate, said spring urging the plunger upwardly from said anvil, a saw clamp secured to said upright member, said clamp having a pair of pad members and a yoke member connected to the clamp member adapted to be swung over the upper end of the plunger for imparting downward movement of the plunger to engage teeth of a saw to be set.

3. In a device of the class described, a base adapted to be removably secured to a support, an anvil on the base, support members on the base stopping short of the anvil, a removable gauge member slidably embracing each of the support members; an upright member on the base opposite the anvil, said upright member having a pair of horizontally disposed vertically spaced plates, each of the plates having an angular hole, an angular reversible cooperating setting plunger reciprocable through the holes, said plunger having a horizontal hole beneath the uppermost plate, a helical spring embracing the plunger, a removable pin secured in the hole of the plunger and in bearing engagement with the spring, said spring being seated on the lowermost plate, an operating handle pivotally mounted on the upright member, said handle having adjustable pad members for engaging and clamping a saw positioned upon the base, and a yoke member pivotally connected to the handle, said yoke member being movable to a position above the upper end of the plunger to impart downward movement of the plunger upon corresponding movement of the handle, to cause the plunger to engage teeth of a saw to be set.

4. A device of the class described, a base adapted to be removably secured to a support, an anvil formed or fitted in said base, a gauging means comprising vertically mounted plates on the base on opposite sides of said anvil and removable gauge member slidably embracing said plates and to engage with the saw teeth to be set, a vertically spaced pivot mounted on said base on the outer side of said gauge members, horizontally mounted plates on said pivot, said plates having square holes adjacent their outer ends, a square cooperating setting plunger reciprocable through the holes and thus held against rotation, said plunger having a horizontal hole on the upper end, a pin member engaged in the hole of said plunger, a coil spring embracing said plunger, the pin being positioned in the said hole member above the spring and under the upper plate member to hold the plunger vertically through the plates toward said anvil, a handle for actuating the plunger, a clamping means for the saw and connected to the handle, adjustable pad members secured to the said clamp member, a strap member secured to the said clamp member adapted to be swung over the upper end on said plunger member whereby pressing downwardly on the handle will cause consequent movement of the plunger member and when the said pad members come in contact with the saw, setting of the saw teeth will be accomplished.

5. A device of the class described, a base adapted to be removably secured to a support, an anvil formed in said base, a selective gauge means mounted on the base, said gauging means comprising a guard member secured to the base, a selectively removable gauge member adapted to slidably embrace said guard members, an upright member vertically positioned on said base member and having pivot members, horizontal plate members mounted on said upright member, said plates having a square hole adjacent the outer ends, a reversible cooperating setting plunger placed through said hole members, a horizontal hole on the upper end of said plunger member, a coil spring embracing said plunger, a pin placed above the spring and under the upper plate in said hole member to normally slide the plunger upwardly from said anvil, saw clamping means on said pivot members including a handle, adjustable pad members secured to said clamp members, a pivotally mounted substantially U-shaped strap on said clamping means adapted to be swung over the upper end of said plunger to move the plunger downwardly to engage a saw tooth to be set, and press the tooth against the anvil.

6. A device of the class described, a base adapted to be removably secured to a support, an anvil member on said base to receive a saw tooth to be set, gauge members on said base vertically mounted to engage with a saw when a saw tooth is to be set, an upright vertically mounted the inner edge of said base, horizontal plates secured to said upright, said plate members having a square hole, a reversible cooperating setting plunger, a coil spring embracing said plunger, a horizontal hole in the upper end of said plunger, said plunger being placed between the horizontal plates and through the square holes of said plates, a pin placed in the horizontal hole of said plunger above the spring and under the upper plate, to hold the plunger vertically and firmly toward the anvil, a clamp member mounted on said upright, a movable strap member mounted on said clamp member adapted to be swung over the said plunger member to engage the teeth of a saw to be set upon downward movement of the clamp member.

7. A device of the class described, a base having a vertically positioned extension having a pair of pivots, an anvil, a vertical gauge member, horizontal plate members secured to said extension, said plates having a square hole adjacent the outer ends, a reversible cooperating setting plunger reciprocable through the holes, said plunger having a triangular shaped extension corresponding to the general shape of a saw tooth and set inwardly toward the saw blade when setting large saw teeth and placed in reverse position so that the apex of the triangular extension is placed outwardly from the saw blade when the plunger is employed in setting small saw teeth, a movable clamp member mounted on said pivots including a handle, vertically adjustable pad members secured to said clamp member, a U-shaped strap member pivotally secured to said clamp member, adapted to be swung over the upper end of said plunger whereby pressing downward of the handle will cause consequent movement of the plunger until the said pads come in contact with a saw blade and setting of the saw teeth will be accomplished.

GEORGE A. VAIPAN.